(12) United States Patent
Ukita

(10) Patent No.: US 6,694,252 B2
(45) Date of Patent: Feb. 17, 2004

(54) METHOD OF DISPLAYING LANDMARK IN NAVIGATION DEVICE

(75) Inventor: Tomohiko Ukita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/070,143
(22) PCT Filed: Jul. 4, 2000
(86) PCT No.: PCT/JP00/04450
§ 371 (c)(1), (2), (4) Date: Mar. 4, 2002
(87) PCT Pub. No.: WO02/03032
PCT Pub. Date: Jan. 10, 2002

(65) Prior Publication Data
US 2003/0105585 A1 Jun. 5, 2003

(51) Int. Cl.<sup>7</sup> ............................................. G06F 17/00
(52) U.S. Cl. ........................ 701/205; 701/208; 701/211
(58) Field of Search .................................. 701/205, 206, 701/207, 208, 209, 211, 212

(56) References Cited

U.S. PATENT DOCUMENTS

| 5,884,218 A | * | 3/1999 | Nimura et al. ............... 701/208 |
| 6,339,746 B1 | * | 1/2002 | Sugiyama et al. .......... 701/209 |

FOREIGN PATENT DOCUMENTS

| EP | 0 944 032 A1 | 9/1999 |
| JP | 08-115493 A | 5/1996 |
| JP | 08-138193 A | 5/1996 |
| JP | 09-152354 A | 6/1997 |
| JP | 09-185321 A | 7/1997 |
| JP | 10-111650 A | 4/1998 |
| JP | 11-003032 A | 1/1999 |

* cited by examiner

Primary Examiner—William A. Cuchlinski, Jr.
Assistant Examiner—Olga Hernandez
(74) Attorney, Agent, or Firm—Birch, Stewart, Kolasch & Birch, LLP

(57) ABSTRACT

Additional marks made up of figures, marks or symbols representing a state in which the disposed state of a facility and/or the supplementary conditions thereof are displayed in combination with a landmark which is peculiar to the facility.

9 Claims, 5 Drawing Sheets

FIG.5

DATA FILE IN INFORMATION MEMORY APPARATUS

| 300 | MAP DATA FILE |
| --- | --- |
| | SEARCHING DATA FILE |
| | GUIDE DATA FILE |
| | MAP MATCHING DATA FILE |
| | DESTINATION DATA FILE |
| | REGISTERED POINT DATA FILE |
| | ROAD DATA FILE |
| | STYLE-WISE DATA FILE |
| 301 | LANDMARK DATA FILE |
| | ---- |

DATA BASE OF FACILITIES TO BE INDICATED  302

| COORDINATES | KIND (PECULIAR LANDMARK) | SIZE | | INSIDE BUILDING | INSIDE PARK | PARKING | DRIVE-THROUGH |
| --- | --- | --- | --- | --- | --- | --- | --- |
| | | LARGE | SMALL | | | | |
| X1 Y1 Z1 | 1 | 1 | 0 | 0 | 0 | 0 | 1 |
| X2 Y2 Z2 | 1 | 0 | 1 | 1 | 0 | 1 | 0 |
| X3 Y3 Z3 | 1 | 0 | 1 | 0 | 1 | 0 | 0 |
| X4 Y4 Z4 | 2 | 1 | 0 | 0 | 0 | 1 | 0 |
| ---- | | ---- | ---- | ---- | ---- | ---- | ---- |

DISPLAYED LANDMARK

METHOD OF DISPLAYING LANDMARK IN NAVIGATION DEVICE

This application is the national phase under 35 U.S.C. §371 of PCT International Application No. PCT/JP00/04450 which has an International filing date of Jul. 4, 2000, which designated the United States of America.

TECHNICAL FIELD

This invention relates to a method of displaying a landmark in a navigation apparatus by which the degree of recognition of the landmark as a sign of a facility displayed on a map screen of the navigation apparatus is improved.

BACKGROUND ART

FIG. 1 is an explanatory view showing a map displayed on a monitor display according to a method of displaying a landmark of a conventional navigation apparatus. In the figure, facilities and places are shown by various landmarks in the form of recognizable signs such as figures, marks, symbols, or the like. Among them, reference numerals 1 and 2 denote landmarks of chained convenience stores run by a company "L." Reference numeral 3 denotes a landmark of a chained fast food shop run by a company "M." Reference numerals 4, 5 and 6 similarly denote landmarks of chained gas stations respectively run by other companies. As the landmarks for indicating these shops, the same kind of business is sometimes displayed by the same symbol mark. However, in order to enable the user to select one according to his/her own preference, a peculiar landmark based on a symbol mark or a trademark of the company running its own chained shops is recently displayed as shown in FIG. 1 to facilitate the recognition of the peculiar landmark.

According to the above-described method of displaying the landmarks, the following may actually occur when driving a motor vehicle. For example, although the landmarks 1 and 2 of the convenience stores of the company "L" are displayed by the same marks, some of these stores are detached, and stores facing a road, and others are disposed inside a building. In the latter case, there is a possibility that the driver may overlook the store if it does not directly face the road. In addition, if the landmark 3 of the fast food shop run by the company "M" faces a road which has no space for parking a motor vehicle and if the shop has no parking lot, the driver will be unable to do the scheduled shopping therein and will therefore have no other choice but pass by the shop. In this manner, since the user fails to grasp the state in which the shop is actually placed or the supplementary conditions thereof in advance, there is such a problem that the user sometimes fails to avail himself/herself of the shop even if he/she has come to the front of the shop which he/she is looking for or cannot immediately cope with the situation in which he/she is placed.

DISCLOSURE OF INVENTION

The method of displaying a landmark in a navigation apparatus according to this invention comprises the steps of: storing an additional mark made up of a figure, a mark and a symbol representing at least one of an installed state and a supplementary condition of the facility in a storage device as a data base; determining, when the landmark is to be displayed on a map of the monitor display, as to whether the facility has at least one of the installed state and the supplementary condition; calling up a corresponding additional mark, if the facility has at least one of the installed state and the supplementary condition, from the data base for displaying in combination with a peculiar landmark of the facility: and displaying the peculiar landmark of the facility as a single landmark, if the facility does not have at least one of the installed state and the supplementary condition.

According to this arrangement, the driver of a motor vehicle immediately notices the state of the facility he is going to drop in as well as the supplementary condition thereof, while he/she is driving the motor vehicle in advance. Therefore, there is such an effect that the driver can concentrate on the driving in a psychologically relaxed manner without confusion, thereby also contributing to the traffic safety.

The method of displaying a landmark in a navigation apparatus according to this invention is characterized in that a size of the peculiar landmark is set to be smaller when displayed in combination with the additional mark than when displayed independently.

According to this arrangement, the landmark to be independently displayed and the landmark to be displayed in combination with an additional mark are set in substantially the same size. Therefore, there is such an effect that no sense of incompatibility can be felt from the viewpoint of display.

The method of displaying a landmark in a navigation apparatus according to this invention is characterized in that a plurality of different additional marks are simultaneously displayed in combination with the peculiar landmark.

According to this arrangement, there is such an effect that the state in which the facility of the peculiar landmark is placed is displayed in more detail, resulting in an effective discrimination.

The method of displaying a landmark in a navigation apparatus according to this invention is characterized in that the additional mark is one of a pictorial representation and a figure, both having an image inclusive of a building, an underground market, a supermarket, a park and so on.

According to this arrangement, there is such an effect that the state in which the facility of the peculiar landmark is placed is made easier to be visually recognized, so that the confirmation of the situation is made immediately.

The method of displaying a landmark in a navigation apparatus according to this invention is characterized in that the additional mark is a mark having an image inclusive of a parking lot, a drive through, or the like.

According to this arrangement, marks such as ordinarily used traffic signals or the like are available for use as additional marks. Therefore, there is such an effect that the supplementary condition of the peculiar landmark is recognizable at a glance.

The method of displaying a landmark in a navigation apparatus according to this invention is characterized in that the additional mark is a figure such as a mesh, a frame, or the like to enclose the peculiar landmark.

According to this arrangement, there is such an effect that an expanded use is provided to the displaying mode of the navigation apparatus by defining in advance the additional mark.

BRIEF DESCRIPTION OF DRAWINGS

FIG. 5 is an explanatory view showing the data construction of the landmark according to the first embodiment of this invention.

BEST MODE FOR CARRYING OUT THE INVENTION

In order to describe this invention in more detail, a description will hereinafter be made about the best mode for carrying out this invention with reference to the accompanying drawings.

(First Embodiment)

Figure 1:
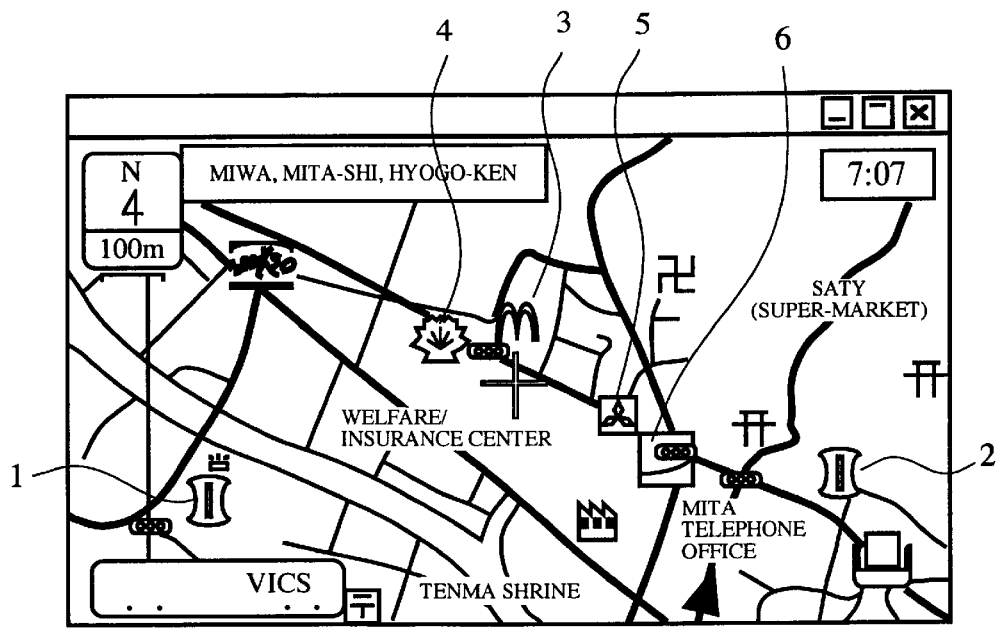
FIG. 1 is an explanatory view showing a map displayed by a landmark indication method of a conventional navigation apparatus.
Figure 2:
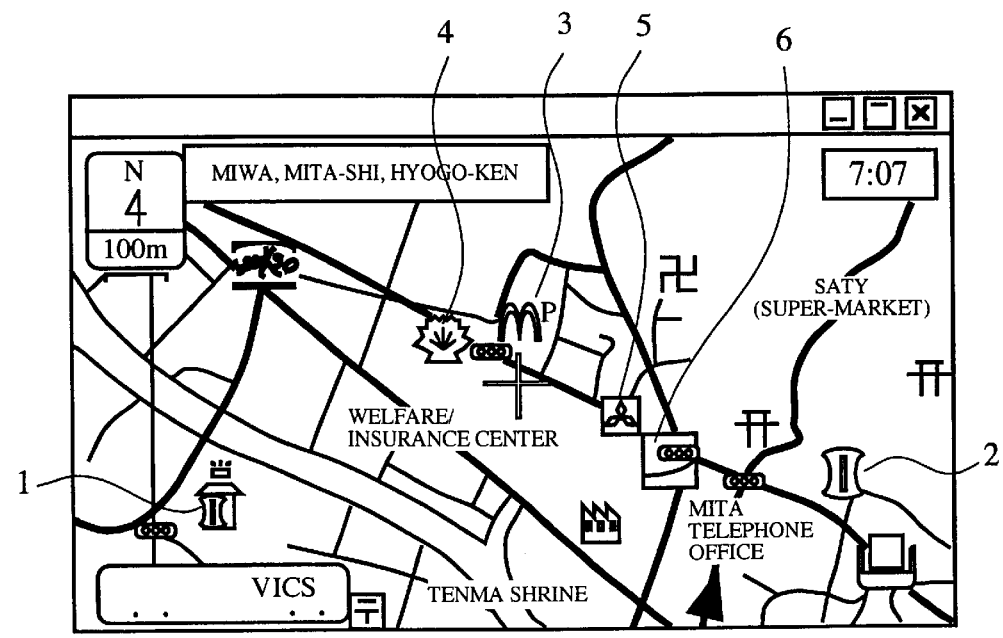
FIG. 2 is an explanatory view showing a map displayed by a landmark displaying method according to a first embodiment of this invention.

FIG. 2 is an explanatory view showing the map screen displayed on a display according to the method of displaying a landmark in a navigation apparatus according to this invention. This figure shows in comparison with FIG. 1 and the same reference numerals have been given to the corresponding portions thereof. In the figure, the landmark 1 of the convenience store run by the company "L" is displayed in a manner overlapped with a mark mocking a building. This is displayed in such a manner to discriminate it from the landmark 2 of the convenience store of the same chain to enable the recognition. Namely, the former landmark 1 means a shop disposed inside a building, while the latter landmark 2 means a shop in a detached house facing the road. In addition, the landmark 3 of the fast food shop run by the company "M" has another mark "P" which is displayed in the close proximity thereto, and it means that there is a parking space available.

Figure 3:
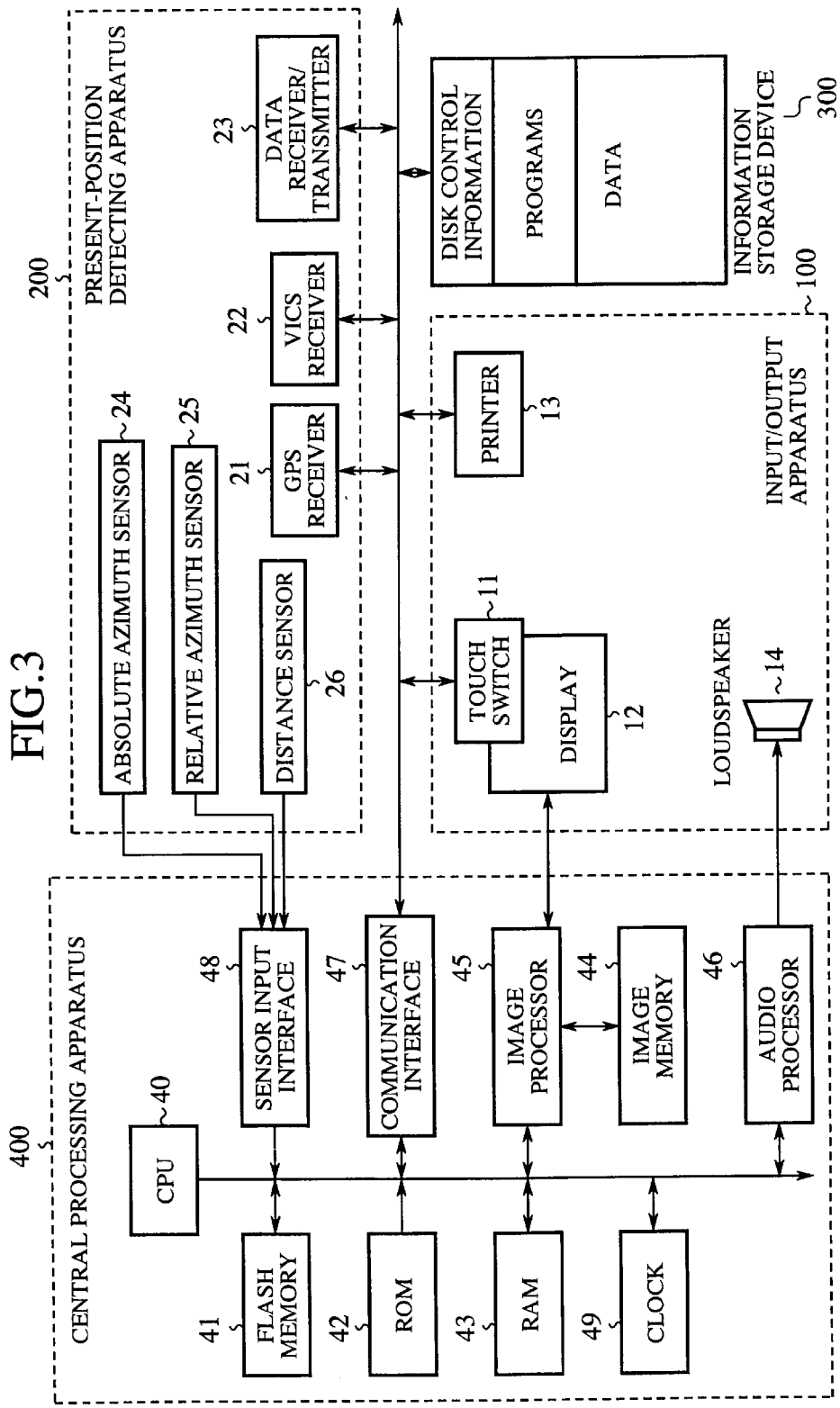
FIG. 3 is a block diagram showing a navigation apparatus for carrying out the landmark displaying method according to the first embodiment of this invention.

FIG. 3 is a block diagram showing a navigation apparatus to be used for carrying out the first embodiment of this invention, and is the one for materializing the method of displaying the recognizable landmarks as those shown in FIG. 2. In the figure, reference numeral 100 denotes an input/output apparatus for inputting and outputting the information about the driving route guide. Reference numeral 200 denotes a present-position detecting apparatus for detecting the information about the present position of a motor vehicle. Reference numeral 300 denotes an information storage device which stores therein: navigation data required for calculating the driving route, displaying data required for driving route guide, and audio guide data; programs such as application programs, an operating system (OS) and so on. Reference numeral 400 denotes a central processing apparatus for performing a driving route search processing, a displaying processing required for driving route guide, audio guide processing and so on, as well as for performing an overall control of the entire system.

The input apparatus 100 is an interface section of the navigation apparatus which gives an instruction about the navigation processing to the central processing apparatus 400 according to the driver's intention, so that the driver can input the destination on the map screen, or can output, where necessary, the guide information by means of sound or the screen. As an inputting section, there are provided a touch switch 11, operating switch, remote controller or the like to input a destination by means of a telephone number, an address, coordinates on the map, or the like, or to make a request for the driving route guide. As an outputting section, there is provided a monitor display 12 to indicate on the screen the input data to be prepared in advance in operating the inputting section, or indicate on the screen the map to the destination, or to automatically indicate the driving route guide according to the request by the driver. It is further provided with a printer 13 for printing a hard copy of the data processed by the central processing apparatus 400 or the data stored in the information storage device 300.

The present-position detecting apparatus 200 is provided with a global positioning system (GPS) receiver 21, a vehicle information and communication system (VICS) receiver 22 and a data transmitter/receiver 23. The GPS receiver 21 is a receiver for receiving the positional information from satellites for the global positioning system for the present position of the motor vehicle. The VICS receiver 22 is a receiver for receiving information by utilizing a frequency modulated (FM) multiplex broadcasting, radio wave beacon, optical beacon and soon. The data transmitter/receiver 23 is the one for performing a bidirectional communication with an information center such as an advanced traffic information service (ATIS) or with other motor vehicles by utilizing a mobile phone, a personal computer or the like.

Further, the present position detecting apparatus 200 is provided with: an absolute azimuth sensor 24 for detecting the running direction of the motor vehicle in an absolute azimuth mode by utilizing, e.g., terrestrial magnetism; a relative azimuth sensor 25 for detecting a relative destination in a relative azimuth mode by using a steering sensor or a gyro sensor; and a distance sensor 26 for detecting a driving distance of the motor vehicle by the number of revolutions of the wheel. By means of these receivers 21, 22 and 23 as well as the sensors 24, 25 and 26, the present-position detecting apparatus 200 is capable of obtaining the information related to the present position of the motor vehicle, the road information, the traffic information, and other service information which is supplied at the present position or the like.

The information storage device 300 is an external storage device which stores therein a navigation program and map data used for performing the navigation program and is generally made up of a compact disc read only memory (CD-ROM), a digital versatile disk read only memory (DVD-ROM), or the like. The stored programs include a program for performing the processing of searching the driving route, a processing program which follows the flow chart shown in this embodiment, a program for performing the indication output required for guiding the driving route, an audio output control required for audio guiding and so on. The data stored in the same storage region as these programs are the data required for the above-described programs, and the display information data required for the driving route guide and the map indication. Further, the data stored in the data storage region are made up of the map data, searching data, guide data, map matching data, destination data, registered point data, road data, style-wise data, landmark data and so on, all of which are data required for the navigation apparatus. The landmark data serve as signs for facilities, parks, or the like to be shown on the map, and include particular companies, shops, or the like, as well as additional mark data related to the present embodiment of this invention.

The central processing apparatus 400 is provided with: a central processing unit (CPU) 40 for performing various operating processes; a flash memory 41 for reading a program out of the information storage device 300 and storing it therein; a ROM 42 for storing therein a program which performs a program checking and a renewing process of the flash memory 41; a random access memory (RAM) 43 for temporarily storing therein searched driving route guide information such as the coordinates of the destination to be set, the code number of the road name, or the like, as well as the data under operation; and an image memory 44 which has stored therein image data for use in displaying on the monitor display 12. The central processing apparatus 400 is further provided with: an image processor 45 which takes out image data from the image memory 44 based on a display output control signal from the CPU 40 for further image processing and outputting it to the monitor display 12; an audio processor 46 which synthesizes voices, phrases, sentences, sounds, or the like read out of the information storage device 300 based on an audio output control signal from the CPU 40 for converting the thus synthesized data to analog data, and for outputting the thus converted data to a loudspeaker 14; a communication interface 47 which performs exchanging of input and output data through communication; a sensor input interface 48 which captures sensor signals from the present-position detecting apparatus 200; and a clock 49 which records date and time into an inner diagnosis information.

The program for performing the above-described updating processing may alternatively be stored in the external storage device 300. Not only the programs related to this invention but also other programs for performing the navigation may all be stored in the CD-ROM or DVD-ROM in the external storage apparatus. Or else, a part or all of those programs may alternatively be stored in the ROM 42 in the main-body side. These setting conditions may be arbitrarily selected by a designer as a matter of design choice.

Figure 4:
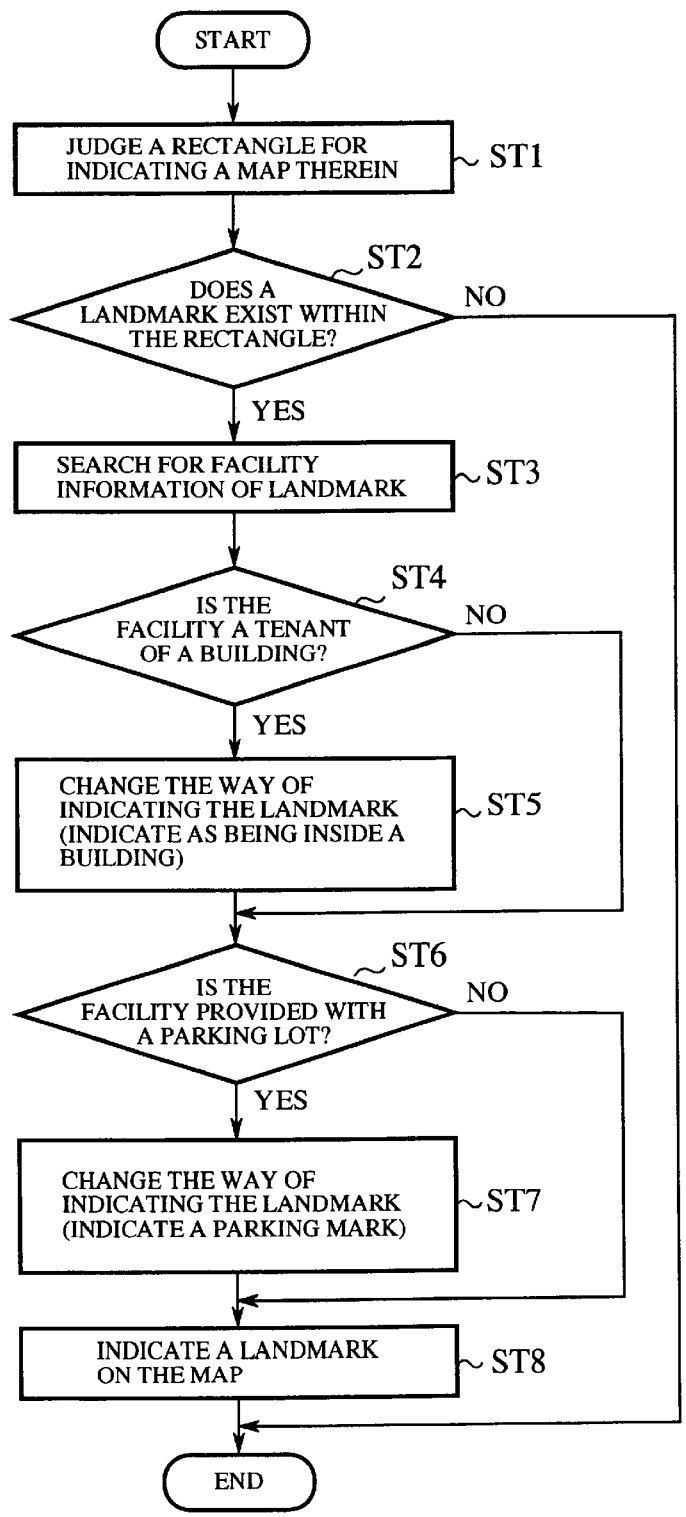
FIG. 4 is a flow chart for explaining the landmark displaying method according to the first embodiment of this invention.

An example of steps of processing the method of displaying a landmark according to the first embodiment of this invention to be carried out by the above-described navigation apparatus will now be described with reference to the flow chart in FIG. 4. As is ordinarily done, the map data are first displayed on the monitor display 12. Landmarks are added for indication on this displayed map. At step ST1, a judgment is made of the displayed screen, i.e., a rectangle for displaying the map therein. A judgment is made at step ST2 as to whether a landmark exists within this rectangle. If there is a landmark at the corresponding coordinate point, a peculiar landmark showing a predetermined facility is taken out at step ST3 from the landmark data stored in the information storage device 300. A judgment is made at step ST4 as to whether or not a supplementary condition to be added to the facility corresponding to the taken out landmark exists. If the searched facility is, for example, a fast food shop of the company "M" and if it is disposed inside a building, the landmark of the shop taken out first is changed and, instead, a landmark in combination with the additional mark showing that the shop is inside a building is taken out at step ST5. After the step ST5, a judgment is made at step ST6 as to whether there is a further supplementary condition to be added such as the one, for example, whether a parking lot is available. If the shop is provided with a space to allow the parking of a motor vehicle, a change is made at step ST7 so that a landmark added with the parking mark is displayed. If there is no supplementary condition, the landmark selected first is displayed as it is on the map at step ST8. As a result, on the map in the monitor display 12, there are displayed the landmark in combination with the additional mark and the singly displayed landmark, thereby facilitating the discrimination therebetween.

The matters and conditions to be added to the landmark may vary in accordance with the facilities in question, but they are easily copes with by increasing the processing steps of the flow chart by predetermined numbers so that the processing system of the navigation apparatus moves accordingly.

Figure 6:
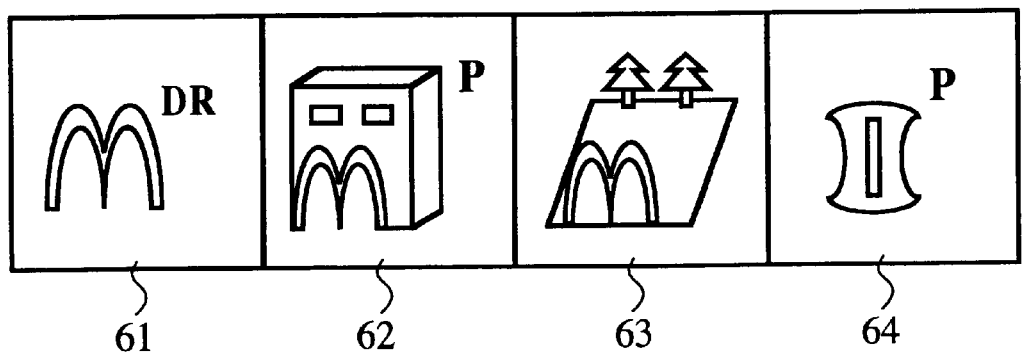
FIG. 6 is an illustration showing an explanatory indication of landmarks according to the first embodiment of this invention.

FIG. 5 shows a data construction of the landmark data. A display mode of the new landmarks to be formulated by first embodiment is shown in FIG. 6. The data stored in the information storage device 300 in FIG. 3 are as listed in the information storage device 300 with the same reference numerals in FIG. 5. In a landmark data file 301 among them, there is stored data base 302 for materializing first embodiment. The column "coordinates" show the point of presence of the displayed facility. It is represented by longitude, latitude, or the like and constitutes an element for determining the position of the facility on the map of the screen. The column "kind" is to designate the peculiar landmark of the displayed facility. The column □size□ shows data to designate the size of the displayed peculiar landmark. The column "inside building" shows data to designate the additional mark in case the corresponding facility is inside a building, with the result that it is difficult to be recognized from the road. The column "inside park" shows data to designate an additional mark in case the corresponding facility is inside a park, with the result that it is difficult to be recognized from the road. The column "parking" shows data to designate an additional mark of a parking mark "P" in case the corresponding facility is additionally provided with a parking lot. The column "drive-through" shows data to designate an additional mark "DR" in case the corresponding facility offers a service capable of shopping while riding on the motor vehicle.

Now let us focus on the first column of the data base 302. If it is assumed that there is a fast food shop of the company "M" as a facility to be present in the point having coordinates X1, Y1, Z1, then the size of the displayed symbol mark is large equipped with a drive-through. Therefore, the peculiar landmark to be finally displayed on the map will be the one 61 in combination with the additional mark as shown in FIG. 6. Similarly, observing the second, third and the fourth lines in the data base 302, we note that the landmarks to be displayed according to the respective conditions are the ones in combination with the additional marks as shown in reference numerals 62, 63, 64, respectively.

As the additional marks to be used in this invention, there are considered pictorial representations or figures imaging a building, an underground shop, a supermarket, a park, or the like; marks such as a parking lot or parking; and also figures such as a mesh, a frame, or the like for enclosing a landmark therein if used together with a definition.

INDUSTRIAL APPLICABILITY

As described above, the method of displaying a landmark in the navigation apparatus of this invention is suitable for improving the distinction of a facility which is one of the frequently visited chained convenience stores or fast food shops from other stores in the same chain, when it uses a symbol mark of the chain stores as its landmark.

What is claimed is:

1. A method of displaying a landmark in a navigation apparatus in which map information, a present position of a motor vehicle, a destination, a driving route, a position of a facility, and a landmark of the facility are displayed on a screen of a monitor display, said method comprising the steps of:

storing an additional mark made up of a figure, a mark, and a symbol representing at least one of an installed state and a supplementary condition of the facility in a storage device;

determining, when the landmark is to be displayed on a map of the monitor display, as to whether the facility has at least one of the installed state and the supplementary condition;

calling up a corresponding additional mark, if the facility has at least one of the installed state and the supplementary condition, from the storage device for displaying in combination with a peculiar landmark of the facility; and displaying the peculiar landmark of the facility with the additional mark, if the facility does not have at least one of the installed state and the supplementary condition then the peculiar landmark of the facility is displayed as a single landmark.

2. The method of displaying a landmark in a navigation apparatus according to claim 1, wherein the size of the peculiar landmark is smaller when displayed in combination with the additional mark than when displayed independently.

3. The method of displaying a landmark in a navigation apparatus according to claim 2, wherein a plurality of different additional marks are simultaneously displayed in combination with the peculiar landmark.

4. The method of displaying a landmark in a navigation apparatus according to claim 1, wherein the additional mark is one of a pictorial representation and a figure, both having an image inclusive of a building, an underground market, a supermarket, and a park.

5. The method of displaying a landmark in a navigation apparatus according to claim 1, wherein the additional mark is a mark having an image inclusive of a parking lot, or a drive-through.

6. The method of displaying a landmark in a navigation apparatus according to claim 1, wherein the additional mark is a figure being representative of a mesh or a frame, to enclose the peculiar landmark.

7. A method of displaying navigational information in a navigation apparatus, the method comprising the steps of:

determining a position of a vehicle;

retrieving information from a database based on the position of the vehicle, the information containing different symbolic pictures associated with a certain facility; and displaying the information containing the different symbolic pictures on a display, wherein the different symbolic pictures contain a symbol, which is representative of the certain facility, and additional graphic representations, which are representative of additional information pertaining to specific information regarding the certain facility.

8. A navigation apparatus comprising:

a present-positioning detector for detecting a position of a vehicle;

an information storage device for providing information based on the position of the vehicle, the information containing different symbolic pictures associated with a certain facility; and a display device for displaying the information containing the different symbolic pictures, wherein the different symbolic pictures contain a symbol, which is representative of the certain facility, and additional graphic representations, which are representative of additional information pertaining to specific information regarding the certain facility.

9. The method of displaying a landmark in a navigation apparatus according to claim 1, wherein the storage device is a database.

* * * * *